(12) United States Patent
Feldhues et al.

(10) Patent No.: US 9,790,352 B2
(45) Date of Patent: *Oct. 17, 2017

(54) RUBBER BLENDS CONTAINING SILICIC ACID AND COMPRISING ADDITIVES CONTAINING SULPHUR

(71) Applicant: LANXESS Deutschland GmbH, Cologne (DE)

(72) Inventors: Ulrich Feldhues, Bergisch Gladbach (DE); Heinz Unterberg, Dormagen (DE); Hermann-Josef Weidenhaupt, Pulham (DE); Melanie Wiedemeier-Jarad, Dormagen (DE)

(73) Assignee: LANXESS Deutschland GmbH, Cologne (DE)

( * ) Notice: Subject to any disclaimer, the term of this patent is extended or adjusted under 35 U.S.C. 154(b) by 336 days.

This patent is subject to a terminal disclaimer.

(21) Appl. No.: 14/405,560

(22) PCT Filed: Jun. 5, 2013

(86) PCT No.: PCT/EP2013/061577
§ 371 (c)(1),
(2) Date: Dec. 4, 2014

(87) PCT Pub. No.: WO2013/182594
PCT Pub. Date: Dec. 12, 2013

(65) Prior Publication Data
US 2015/0133581 A1    May 14, 2015

(30) Foreign Application Priority Data
Jun. 6, 2012  (EP) ..................................... 12170990

(51) Int. Cl.
*C08L 9/06* (2006.01)
*C08K 5/372* (2006.01)
*B60C 1/00* (2006.01)

(52) U.S. Cl.
CPC .............. *C08L 9/06* (2013.01); *B60C 1/0016* (2013.01); *C08K 5/372* (2013.01); *C08L 2205/02* (2013.01); *C08L 2205/03* (2013.01); *Y02T 10/862* (2013.01)

(58) Field of Classification Search
CPC ........................................................ C08L 9/06
USPC ........................................................ 523/156
See application file for complete search history.

(56) References Cited

U.S. PATENT DOCUMENTS

| | | |
|---|---|---|
| 4,076,550 A | 2/1978 | Thurn et al. |
| 5,442,099 A | 8/1995 | Wolpers et al. |
| 5,663,226 A | 9/1997 | Scholl et al. |
| 5,733,965 A | 3/1998 | Scholl et al. |
| 6,040,389 A | 3/2000 | Wideman et al. |
| 6,268,421 B1 | 7/2001 | Dittrich et al. |
| 6,359,045 B1 * | 3/2002 | Jeske ....................... C08K 5/39 524/201 |
| 6,372,857 B1 * | 4/2002 | Obrecht ................. C08K 5/372 525/332.6 |
| 6,521,684 B2 | 2/2003 | Scholl et al. |
| 2003/0092827 A1 * | 5/2003 | Obrecht ............... C08K 3/0033 524/525 |

FOREIGN PATENT DOCUMENTS

| | | |
|---|---|---|
| EP | 0489313 A1 | 8/1995 |
| WO | 2010000294 A1 | 1/2010 |

OTHER PUBLICATIONS

International Search Report from International Application No. PCT/EP2013/061577, dated Mar. 13, 2014, two pages.

* cited by examiner

Primary Examiner — Doris Lee

(57) ABSTRACT

The present invention relates to a silica-containing rubber mixture produced from at least one rubber, one sulphur-containing alkoxysilane, one crosslinking agent, one filler, and optionally further rubber auxiliary products and from 0.1 to 15 phr of a polysulphide additive of the formula (I)

A—S—(S)$_x$—S—Y—S—(S)$_x$—S-A        (I)

where x is 0, 1 or 2,
Y is an aliphatic, cycloaliphatic or aromatic group that is optionally substituted or else comprises heteroatoms and
A is an optionally substituted hydroxyethyl, carboxyaryl, hydroxyaryl, carboxyalkyl or thionamide moiety,
and comprises from 0.1 to 15 parts by weight, based on 100 parts by weight of rubber used, of 1,6-bis(N,N-dibenzylthiocarbamoyldithio)hexane (CAS No.: 151900-44-6).

20 Claims, No Drawings

RUBBER BLENDS CONTAINING SILICIC ACID AND COMPRISING ADDITIVES CONTAINING SULPHUR

The present invention relates to silica-containing rubber mixtures which comprise sulphur-containing additives, to processes for the production of this rubber mixture, to use thereof and to rubber vulcanisates produced therefrom and to an additive mixture for rubber.

Many proposals have been devised for successful production of tyres with reduced rolling resistance. DE-A2255577 and 4435311. EP-A100670347, and also U.S. Pat. No. 4,709,065 have described particular polysulphidic silanes as reinforcing additives for silica-containing rubber vulcanisates. However, the use of the polysulphidic silanes described in those documents as reinforcing additives for silica-containing rubber vulcanisates have the disadvantage that in order to achieve acceptable processability it is necessary to use relatively large quantities of the expensive polysulphidic silanes, and that hardness is unsatisfactory.

Other additional substances have been proposed for improving the processability of silica-containing rubber mixtures, for example fatty acid esters, fatty acid salts or mineral oils. The additional substances mentioned have the disadvantage that they increase flowability, but at the same time reduce the moduli at relatively high elongation (e.g. from 100% to 300%) or else reduce the hardness of the vulcanisates, and some of the reinforcing effect of the filler is therefore lost. Insufficient hardness or stiffness of the vulcanisate results in unsatisfactory running performance of the tyre, particularly in curves.

An increase in the quantity added of the reinforcing filler increases the hardness of the vulcanisate, but the higher viscosity of the mixture is disadvantageous for processability, and the same applies to a reduction in the quantity of the plasticizing oil.

EP 1 134 253 describes polyether additives for silica-containing rubber vulcanisates which do not exhibit the abovementioned disadvantage of reducing the modulus. However, the person skilled in the art requires a usage quantity of 8% by weight of the product, based on the rubber, in order to increase the Shore A hardness value by 3 units. The low modulus at 300% elongation is disadvantageous.

EP 0 489 313 describes additives with good mechanical properties and with improved hysteresis performance. However, the examples reveal only slight, or no, increase of Shore A hardness in comparison with the prior art, bis[3-(triethoxysilyl)propyl]tetrasulphide according to German Offenlegungsschrift 2 255 577, and therefore no improvement of interaction between polymer and filler.

EP 1 000 968 moreover uses bis[3-(triethoxysilyl)propyl] tetrasulphides in combination with a specific reversion stabilizer in SBR, where the 300-modulus values are very low and therefore inadequate.

EP 0 791 622 BI describes a rubber composition with at least one diene-based elastomer, filler composed of silica and of carbon black, and also with a silica coupling agent, selected from
(i) tetrathiodipropanol polysulphide mixture or
(ii) combination of tetrathiodipropanol polysulphide and bis(3-trialkoxysilylalkyl) polysulphide. In particular, the quantity of tetrathiodipropanol polysulphide is markedly greater than the quantity of bis(3-trialkoxysilylalkyl)polysulphide, and this is not advantageous economically because the tetrathiodipropanol polysulphide is relatively expensive. In addition, the said mixture exhibits very low tensile strength values. It can be concluded that the said mixture is too soft (as confirmed by the Shore A values measured), as reflected in relatively poor running performance of the tyre, and also reduced lifetime.

It is an object of the present invention to provide rubber mixtures which comprise a specific combination of additional substances which do not impair the flowability of rubber mixtures and which provide vulcanisates produced therefrom with good properties, in particular in respect of rolling resistance, abrasion and wet skid performance in tyres and the hardness or stiffness of the vulcanisate, with the possibility of resultant improvement in the running performance of tyres.

Surprisingly, it has now been found that, in combination with sulphur-containing alkoxysilanes 1,6-bis(N,N-dibenzylthiocarbamoyldithio)hexane (CAS No.: 151900-44-6) and certain sulphur-containing additives do not adversely affect the flowability of rubber mixtures and lead to vulcanisates with good dynamic performance, relatively short scorch time, good hardness/stiffness, markedly improved rolling resistance and, in particular, less abrasion. The full vulcanization time is moreover markedly improved.

It is believed that the synergistic effect results from improved interaction between polymer and filler.

The invention therefore provides rubber mixtures produced from at least one rubber, one sulphur-containing alkoxysilane, one crosslinking agent, one filler, and optionally further rubber auxiliary products, and also at least one sulphur-containing additive of the formula (I)

$$A-S-(S)_x-S-Y-S-(S)_x-S-A \qquad (1)$$

where x is 0, 1 or 2,
Y is an aliphatic, cycloaliphatic or aromatic group that is optionally substituted or else comprises heteroatoms and
A is a moiety

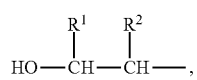

where $R^1$ to $R^2$ are identical or different and are hydrogen, $C_1$-$C_6$-alkyl, $C_5$-$C_6$-cycloalkyl, $C_6$-$C_{10}$-aryl or a group —$CH_2$—$OR^1$, —$CH_2$—$CH_2$—$OR^5$, —$NHR^5$, —$COR^5$, —$COOR^5$. —$CH_2COOR^1$, where $R^5$=hydrogen, $C_1$-$C_6$-alkyl, $C_5$-$C_6$-cycloalkyl, $C_6$-$C_{10}$-aryl or $C_1$-$C_6$-acyl, or
A is a moiety

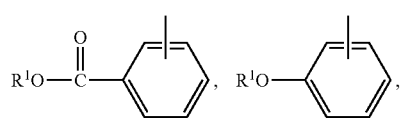

in which $R^1$ and $R^2$ are identical or different and are hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^3$, —$CH_2COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl, or
A is a moiety

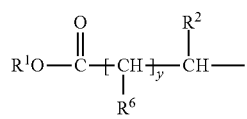

in which $R^1$ to $R^2$ are identical or different and are hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl and $R^6$ is hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl and y is 0, 1 or 2, and from 0.1 to 15 parts by weight, based on 100 parts by weight of rubber used, of 1,6-bis(N,N-dibenzylthiocarbamoyl-dithio)hexane (CAS No.: 151900-44-6).

The invention further provides rubber mixtures produced from at least one rubber, one sulphur-containing alkoxysilane, one crosslinking agent, one filler, and optionally further rubber auxiliary products, and also at least one sulphur-containing additive of the formula (I)

$$A\text{-}S\text{—}(S)_x\text{—}S\text{—}Y\text{—}S\text{—}(S)_x\text{—}S\text{-}A \quad (I)$$

where x is 0,
Y is —$(CH_2)_6$— and
A is a moiety

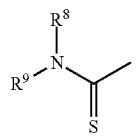

in which
$R^8$ and $R^9$ are mutually independently hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$CH_2$—$COOR^5$, —$CH_2$—$CH_2$—$COOR^5$ and $R^8$ and $R^9$ can also optionally form a ring together with the respective nitrogen atom, and $R^5$ is defined as above, where both moieties A of the compound of the formula I can be identical or different, and at least one of the moieties $R^8$ and $R^9$ on one of the moieties A comprises one or more oxygen atoms,
and comprises from 0.1 to 15 parts by weight, based on 100 parts by weight of rubber used, of 1,6-bis(N,N-dibenzylthiocarbamoyldithio)hexane (CAS No.: 151900-44-6).

It is particularly preferable that Y is one of the groups:

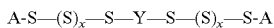  where a = from 2 to 12,

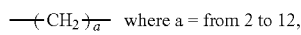  where a = from 2 to 12,

—$CH_2CH_2$—($OCH_2CH_2$)$_b$— where b = from 1 to 4,

—$CH_2CH_2$—($NHCH_2CH_2$)$_b$— where b = from 1 to 4.

It is very particularly preferable that Y is —$(CH_2)_6$—.
It is preferable to use, as polysulphide additive, at least one of the compounds of the formulae (II) and (III):

(II)
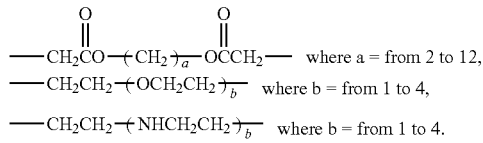

(III)
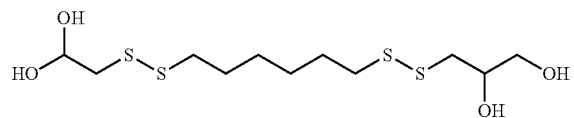

It is preferable to use, as polysulphide additive, at least one of the compounds of the formulae (IV), (IVa), (V), (Va), (VI), (VIa).

(IV)
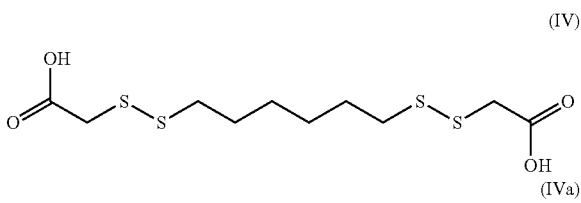

(IVa)
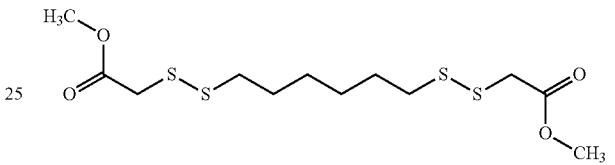

(V)
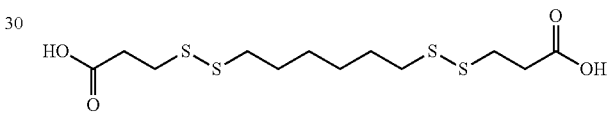

(Va)
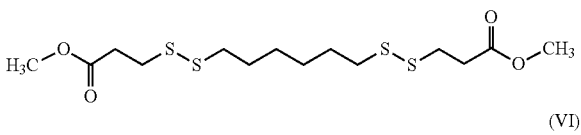

(VI)
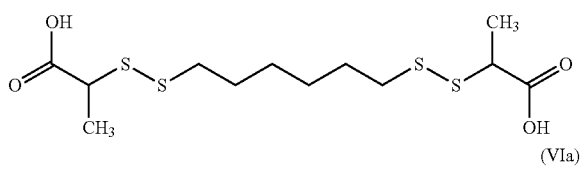

(VIa)
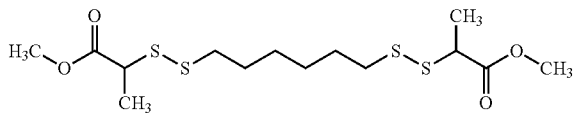

It is preferable to use, as polysulphide additive, at least one compound of the formula (VII).

(VII)
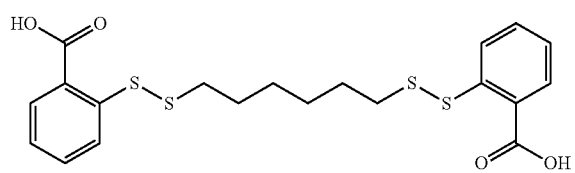

It is preferable to use, as polysulphide additive, at least one of the compounds of the formula (VIII),

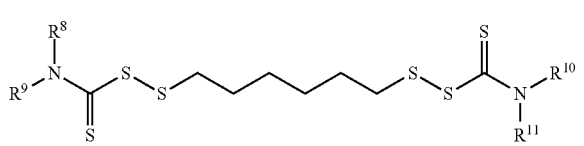

(VIII)

in which $R^8$, $R^9$, $R^{10}$ and $R^{11}$ are mutually independently hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$CH_2$—$COOR^5$, —$CH_2$—$CH_2$—$COOR^5$ and $R^8$ and $R^9$ and, respectively, $R^{10}$ and $R^{11}$ can also optionally form a ring together with the respective nitrogen atom, and $R^5$ is as defined above, and at least one of the moieties $R^8$, $R^9$, $R^{10}$ and $R^{11}$ comprises one or more oxygen atoms.

It is preferable to use, as polysulphide additive, at least one compound of the formula (IX).

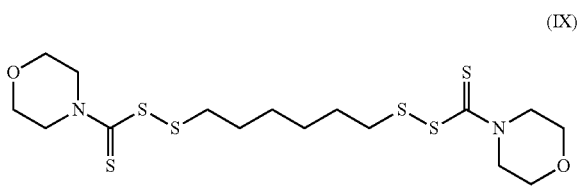 [SMILES: S=C(SSCCCCCCSSC(=S)N1CCOCC1)N1CCOCC1]

(IX)

It is preferable to use, as polysulphide additive, at least one compound of the formula (X).

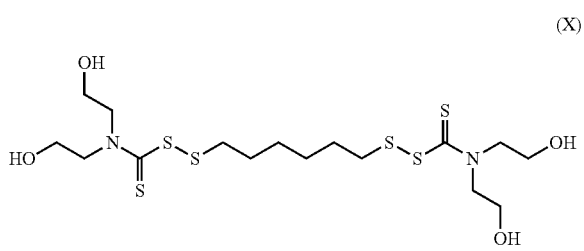 [SMILES: OCCN(CCO)C(=S)SSCCCCCCSSC(=S)N(CCO)CCO]

(X)

It is preferable to use, as polysulphide additive, at least one compound of the formula (XI).

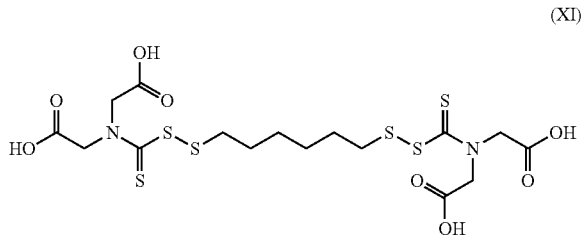 [SMILES: O=C(O)CN(CC(=O)O)C(=S)SSCCCCCCSSC(=S)N(CC(=O)O)CC(=O)O]

(XI)

The addition of the rubber additive 1,6-bis(N,N-dibenzylthiocarbamoyldithio)hexane (CAS No.: 151900-44-6) to be used according to the invention, and also of at least one sulphur-containing additive of the formula (I), and also the addition of, optionally, other additional substances preferably takes place in the first portion of the mixing process when temperatures of the composition are from 120 to 200° C.; however, it can also take place later at lower temperatures (from 20 to 120° C.), for example with sulphur crosslinking agent and/or with accelerator. The form in which the additive of the invention is added here can be directly that of a mixture of the components 1,6-bis(N,N-dibenzylthiocarbamoyldithio)hexane (CAS No.: 151900-44-6) and at least one sulphur-containing additive of the formula (I), or can be that of the individual components.

Other preferred polysulphide additives are listed in the Examples.

It is preferable that the silica-containing rubber mixture of the invention comprises at least one SBR rubber and at least one BR rubber.

It preferably comprises at least one SBR rubber and at least one BR rubber, in a ratio by weight SBR:BR=from 60:40 to 90:10.

It can preferably also comprise at least one NR rubber.

It is preferable that it comprises at least one SBR rubber and at least one BR rubber and at least one NR rubber in a ratio of at least 60 and at most 85 percent by weight of SBR, based on rubber, and at least 10 and at most 35 percent by weight of BR, based on rubber, and at least 5 and at most 20 percent by weight of NR, based on rubber.

Both natural rubber and synthetic rubbers are suitable for the production of the rubber mixtures of the invention and of the rubber vulcanisates of the invention. Preferred synthetic rubbers are described by way of example in W. Hofmann, Kautschuktechnologie [Rubber technology], Genter-Verlag. Stuttgart 1980.

They encompass inter alia

BR— polybutadiene
ABR—butadiene/$C_1$-$C_4$-alkyl acrylate copolymer
CR—polychloroprene
IR—polyisoprene
SBR—styrene/butadiene copolymers with styrene contents of from 1 to 60% by weight, preferably from 20 to 50% by weight
IIR—isobutylene/isoprene copolymers
NBR—butadiene/acrylonitrile copolymers with acrylonitrile contents of from 5 to 60% by weight, preferably from 10 to 50% by weight
HNBR—partially hydrogenated or fully hydrogenated NBR rubber
EPDM—ethylene/propylene/diene copolymers, and also mixtures of these rubbers.

It is preferable that the silica-containing rubber mixture according to the invention comprises from 0.3 to 7 parts by weight of one or more polysulphide additives of the formula (I) or of any of the following formulae derived therefrom, as listed in the claims, based on 100 parts by weight of rubber used and from 0.3 to 7 parts by weight of 1,6-bis(N,N-dibenzylthiocarbamoyldithio)hexane (CAS No.: 151900-44-6), based on 100 parts by weight of rubber used.

It is preferable that the quantity of sulphur-containing alkoxysilane is greater than or equal to the quantity of the polysulphide additive of the formula (I).

It is preferable to use the sulphur-containing alkoxysilane in a ratio by weight of from 1.5:1 to 20:1, particularly from 5:1 to 15:1, in relation to the polysulphide additive of the formula (I).

The rubber mixture of the invention preferably comprises from 0.5 to 5 parts by weight, based on 100 parts by weight of rubber used, of a polysulphide additive of the formula (I), and preferably comprises from 0.5 to 5 parts by weight of 1,6-bis(N,N-dibenzylthiocarbamoyldithio)hexane (CAS No.: 151900-44-6), based on 100 parts by weight of rubber used.

The present invention further provides rubber vulcanisates which can be produced from the rubber mixtures of the invention.

The present invention further provides a process for the production of filled rubber vulcanisates, which is characterized in that
i) at least one rubber is mixed with
ii) from 10 to 150% by weight, preferably from 30 to 120% by weight, based on rubber (i), of filler and
iii) from 0.1 to 15% by weight, preferably from 0.3 to 7% by weight, based on rubber (i), of polysulphide additives of the formula (I) and
iv) from 0.1 to 15% by weight, preferably from 0.3 to 7% by weight, of 1,6-bis(N,N-dibenzylthiocarbamoyldithio) hexane (CAS No.: 151900-44-6), based on rubber (i)

where temperatures of the composition are at least 120° C. and shear rates are from 1 to 1000 sec (exp.-1), preferably from 1 to 100 sec (exp.-1) and the mixture is then vulcanized conventionally after addition of further vulcanization chemicals.

It is preferable that the addition of the inventive polysulphide additives of the formula (I), and also the addition of 1,6-bis(N,N-dibenzylthiocarbamoyldithio)hexane (CAS No.: 15190044-6) takes place in the first portion of the mixing process where temperatures of the composition are from 100 to 200° C. and shear rates are as mentioned, but it can also take place later at lower temperatures (from 40 to 100° C.), for example together with sulphur and accelerator.

The form in which the polysulphide additives of the formula (I) and 1,6-bis(N,N-dibenzylthiocarbamoyldithio) hexane (CAS No.: 151900-44-6) are added to the mixing process can mutually independently be either pure form or else a form absorbed on inert, organic or inorganic carriers. Preferred carrier materials are silica, natural or synthetic silicates, aluminium oxide and/or carbon blacks.

It is also possible that the polysulphide additives of the formula (I) are added to the mixing process in the form of a mixture with 1,6-bis(N,N-dibenzylthiocarbamoyldithio) hexane (CAS No.: 15190044-6). For the purposes of this invention, silica-containing fillers that can be used for the rubber mixture and rubber vulcanisates of the invention are the following fillers:

fine-particle silica, produced for example by precipitation from solutions of silicates or flame hydrolysis of silicon halides with specific surface areas of from 5 to 1000 $m^2/g$, preferably from 20 to 400 $m^2/g$ (BET surface area) and with primary particle sizes of from 10 to 400 nm. The silicas can optionally also take the form of mixed oxides with other metal oxides, such as Al, Mg, Ca, Ba, Zn, Zr, Ti oxides.

Synthetic silicates, such as aluminium silicate, alkaline earth metal silicates, such as magnesium silicate or calcium silicate, with BET surface areas of from 20 to 400 $m^2/g$ and primary particle size of from 10 to 400 nm, natural silicates, such as kaolin and other naturally occurring silicas, glass fibres and glass-fibre products (mats, strands) or glass microbeads.

Other fillers that can be used are carbon blacks. The carbon blacks to be used here are produced by way of example by the lamp-black process, furnace-black process or gas-black process and have BET surface areas of from 20 to 200 $m^2/g$, examples being SAF, ISAF, IISAF, HAF, FEF, or GPF carbon blacks.

Preferred quantities used of the polysulphide additives of the formula (I) in the rubber mixtures of the invention are from 0.3 to 7%, based on rubber.

One particularly preferred variant consists in the combination of silica, carbon black and polysulphide additives of the formula (I). The ratio of silica to carbon black in this combination can be varied as desired. From the point of view of tyre technology, preference is given to a silica: carbon black ratio of from 20:1 to 15:1.

Sulphur-containing silanes that can be used for the rubber vulcanisates according to the invention are preferably bis(triethoxysilylpropyl) tetrasulphane and the corresponding disulphane and 3-triethoxysilyl-1-propanethiol or silanes such as Si 363 from Evonik, Germany or silane NXT or NXT Z from Momentive (previously GE, USA), where the alkoxy moiety is methoxy or ethoxy where quantities used are from 2 to 20 parts by weight, preferably from 3 to 11 parts by weight, calculated in each case as 100% strength active ingredient and based on 100 parts by weight of rubber. However, it is also possible to use a mixture made of the said sulphur-containing silanes. Liquid sulphur-containing silanes can have been absorbed on a carrier to improve ease of metering and/or ease of dispersion (dry liquid). Active ingredient content is from 30 to 70 parts by weight, preferably from 40 to 60 parts by weight, for every 100 parts by weight of dry liquid.

The rubber vulcanisates according to the invention can comprise other rubber auxiliary products, for example reaction accelerators, antioxidants, heat stabilizers, light stabilizers, antiozonants, processing aids, plasticizers, tackifiers, blowing agents, dyes, pigments, waxes, extenders, organic acids, retardants, metal oxides, and also activators, such as triethanolamine, polyethylene glycol, hexanetriol, where these are known to the rubber industry.

The quantity used of the rubber auxiliary products is conventional and depends inter alia on the intended purpose of the vulcanisates. Conventional quantities, based on rubber, are from 0.1 to 30% by weight.

The following are used as crosslinking agents: peroxides, sulphur, magnesium oxide, zinc oxide, and the known vulcanization accelerators can also be added to these, for example mercaptobenzothiazoles, -sulphenamides, thiurams, thiocarbamates, guanidines, xanthogenates and thiophosphates. Preference is given to sulphur.

The quantities used of the crosslinking agents and vulcanization accelerators are about 0.1 to 10% by weight, preferably 0.1 to 5% by weight, based on rubber.

As mentioned above, it is advantageous to add antioxidants to the rubber mixture to counteract the effect of heat and oxygen. Suitable phenolic antioxidants are alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioether, 2,2'-methylenebis(4-methyl-6-tert-butylphenol) (BPH), and also sterically hindered thiobisphenols.

If discoloration of the rubber is not of importance, it is also possible to use aminic antioxidants, e.g. mixtures of diaryl-p-phenylenediamines (DTPD), octylated diphenylamine (ODPA), phenyl-α-naphthylamine (PAN), phenyl-j-naphthylamine (PBN), preferably those based on phenylenediamine. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD). N,N'-bis(1,4-dimethylpentyl)-p-phenylenediamine (77PD).

Among the other antioxidants are phosphites such as tris(nonylphenyl)phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic antioxidants. TMQ, MBI and MMBI are mainly used for NBR types which are vulcanized peroxidically.

Ozone resistance can be improved by using antioxidants known to a person skilled in the art, such as N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD), enol ethers or cyclic acetals.

Processing aids are intended to act between the rubber particles and to counteract frictional forces during the mixing, plastification and shaping process. Processing aids which can be present in the rubber mixture according to the invention are any of the lubricants conventionally used for the processing of plastics, for example hydrocarbons, such as oils, paraffins and PE waxes, fatty alcohols having from 6 to 20 carbon atoms, ketones, carboxylic acids, such as fatty acids and montanic acids, oxidized PE wax, metal salts of carboxylic acids, carboxamides and carboxylic esters, for example with the following alcohols: ethanol, fatty alcohols, glycerol, ethanediol, pentaerythritol, and long-chain carboxylic acids as acid component.

The rubber mixture can be crosslinked not only with sulphur accelerator systems but also with peroxides.

Examples of crosslinking agents that can be used are peroxidic crosslinking agents such as bis(2,4-dichlorobenzyl) peroxide, dibenzoyl peroxide, bis(4-chlorobenzoyl) peroxide, 1,1-bis(tert-butylperoxy)-3,3,5-trimethylcyclohexane, tert-butyl perbenzoate, 2,2-bis(tert-butylperoxy)butene, 4,4-di-tert-butyl peroxynonylvalerate, dicumyl peroxide, 2,5-dimethyl-2,5-di(tert-butylperoxy)hexane, tert-butylcumyl peroxide, 1,3-bis(tert-butylperoxyisopropyl)benzene, di-tert-butyl peroxide and 2,5-dimethyl-2,5-di(tert-butylperoxy)hex-3-yne.

It can be advantageous to use, alongside the said peroxidic crosslinking agents, further additions which can be used to increase crosslinking yield: a suitable example here being triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

Another crosslinking agent that can be used is sulphur in elemental soluble or insoluble form or sulphur donors.

Examples of sulphur donors that can be used are dimorpholyl disulphide (DTDM), 2-morpholino-dithiobenzothiazole (MBSS), caprolactam disulphide, dipentamethylenethiuram tetrasulphide (DPTT), and tetramethylthiuram disulphide (TMTD).

For the sulphur-vulcanization of the rubber mixture according to the invention, it is also possible to use further additions which can be used to increase crosslinking yield. In principle, however, it is also possible to use sulphur or sulphur donors alone for crosslinking.

Examples of suitable additions which can be used to increase crosslinking yield are dithiocarbamates, thiurams, thiazoles, sulphenamides, xanthogenates, bi- or polycyclic amines, guanidine derivatives, dithiophosphates, caprolactams and thiourea derivatives.

Examples of equally suitable additions are: diamine zinc diisocyanate, hexamethylenetetramine, 1,3-bis(citraconimidomethyl)benzene and also cyclic disulphanes.

Preference is given to the sulphur accelerator system in the rubber mixture according to the invention.

In order to reduce flammability and to reduce smoke generation during combustion, the rubber mixture composition according to the invention can also comprise flame retardants. An example of a flame retardant used is antimony trioxide, phosphoric esters, chloroparaffin, aluminium hydroxide, boron compounds, zinc compounds, molybdenum trioxide, ferrocene, calcium carbonate or magnesium carbonate.

The rubber vulcanisate can also comprise other synthetic polymers, acting by way of example as polymeric processing aids or impact modifiers. The said synthetic polymers are selected from the group consisting of the homo- and copolymers based on ethylene, propylene, butadiene, styrene, vinyl acetate, vinyl chloride, glycidyl acrylate, glycidyl methacrylate, acrylates and methacrylates having alcohol components of branched or unbranched C1-C10-alcohols. Particular mention may be made of polyacrylates having identical or different alcohol moieties from the group of the C4-C8-alcohols, particularly of butanol, hexanol, octanol and 2-ethylhexanol, polymethyl methacrylate, methyl methacrylate-butyl acrylate copolymers, methyl methacrylate-butyl methacrylate copolymers, ethylene-vinyl acetate copolymers, chlorinated polyethylene, ethylene-propylene copolymers, ethylene-propylene-diene copolymers.

The rubber vulcanisate according to the invention can be used for producing foams. For this, chemical or physical blowing agents are added. Chemical blowing agents that can be used are any of the substances known for this purpose, for example azodicarbonamide, p-toluolsulphonyl hydrazide, 4,4'-oxybis(benzenesulphonyl hydrazide), p-toluenesulphonylsemicarbazide, 5-phenyltetrazole, N,N'-dinitrosopentamethylenetetramine, zinc carbonate or sodium hydrogencarbonate, and also mixtures comprising these substances. An example of a suitable physical blowing agent is carbon dioxide or halogenated hydrocarbons.

The vulcanization process can take place at temperatures of from 100 to 200° C., preferably from 130 to 180° C., optionally under a pressure of from 10 to 200 bar.

The blending of the rubber with the filler and with the sulphur-containing additives of the formula (I) can be carried out in/on conventional mixing assemblies, for example rolls, internal mixers and mixing extruders.

The rubber vulcanisates according to the invention are suitable for producing mouldings with improved properties, e.g. for producing cable sheathing, hoses, drive belts, conveyor belts, roll coverings, tyres, shoe soles, sealing rings and damping elements.

An important factor in the processing of rubbers is that the rubber mixture initially prepared with the additives has low flow viscosity (Mooney viscosity ML 1+4/100° C.), so that it is easy to process. In many applications, the intention is that the vulcanization process which follows (for example at 170° C., t95) for the rubber mixture is to proceed as rapidly as possible with exposure to heat, in order to restrict the cost of time and of energy.

The shaping-dependent scorch time (for example t5) is intended to be within a narrow range of times, in particular >300 seconds and <1000 seconds.

It is preferable that the loss factor tan delta of a vulcanisate produced from the silica-containing rubber mixture according to the invention under heating conditions 170° C./t95 is <0.13 at 60° C. and that the Shore A hardness thereof is simultaneously >67 at 23° C., and it is particularly preferable that the loss factor tan delta is <0.12 at 60° C. and that the shore A hardness is simultaneously >67 at 23° C.

The 300 modulus value of the vulcanisate is >12 MPa, preferably >15 MPa, in particular >20 MPa.

It is preferable that the loss factor tan delta of a vulcanisate produced from the silica-containing rubber mixture under heating conditions 170° C./t95 is less than 0.12 at 60° C. and that its scorch time is simultaneously greater than 300 seconds, but less than 1000 seconds.

It is preferable that the loss factor tan delta of a vulcanisate produced from the silica-containing rubber mixture under heating conditions 170° C./t95 is less than 0.12 at 60° C. and that its full vulcanisation time is simultaneously less than 1000 seconds, preferably less than 500 seconds.

It is preferable that the scorch time of a vulcanisate produced from the silica-containing rubber mixture under heating conditions 170° C./t95 is greater than 300 seconds and that its full vulcanisation time is simultaneously less than 500 seconds.

The invention further provides the use of the silica-containing rubber mixture of the invention for the production of vulcanisates and rubber mouldings of any type, in particular for the production of tyres and tyre components.

The invention further provides an additive mixture comprising one or more polysulphide additives of the formula (I) and 1,6-bis(N,N-dibenzylthiocarbamoyldithio)hexane (CAS No.: 151900-44-6).

It is preferable that the additive mixture comprises from 10 to 90 parts by weight of one or more polysulphide additives of the formula (I), based on 100 parts by weight of additive mixture, and from 10 to 90 parts by weight, based on 100 parts by weight of additive mixture, of 1,6-bis(N,N-dibenzylthiocarbamoyldithio)hexane (CAS No.: 151900-44-6).

It is preferable that the ratio by weight of one or more polysulphide additives of the formula (I) to 1,6-bis(N,N-dibenzylthiocarbamoyldithio)hexane (CAS No.: 151900-44-6) in the additive mixture of the invention is from 10:90 to 90:10, in particular from 25:75 to 75:25.

The automobile industry has been searching for cost-effective ways of reaching the target of no more than 130 g/km of $CO_2$ emission, at least since the European Union has been concerned with limits for carbon dioxide emission from cars. Low-rolling-resistance tyres are of substantial importance here. They reduce fuel consumption by requiring less energy for deformation during freewheeling.

In order that the reduction of rolling resistance is not achieved at the cost of other important properties, the requirements relating to wet grip and rolling noise are also simultaneously defined. A first indication of wet skid performance and rolling resistance is given by the loss factor tan delta. This should be as high as possible at 0° C. (good wet skid resistance) and as low as possible at from 60 to 70° C. (low rolling resistance). The hardness of a rubber vulcanisate gives a first indication of its stiffness.

POLYSULPHIDE ADDITIVE EXAMPLES

Example 1

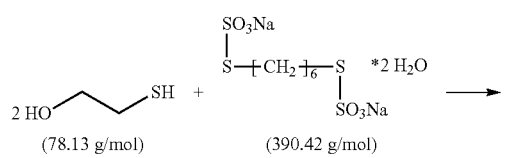

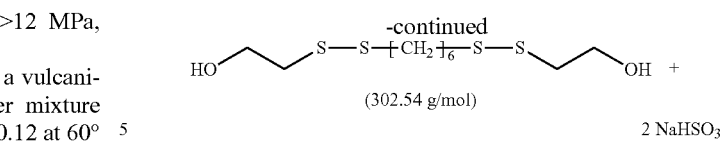

Apparatus: 2000 ml four-necked flask with thermometer, dropping funnel with pressure equalization, reflux condenser with gas-discharge attachment (bubble counter) and tubing, stirrer Initial charge: 79.3 g=0.2 mol of Duralink HTS from Flexsys (98.48%)
480 ml of demineralized water
33.6 g=0.4 mol of sodium hydrogencarbonate
32.5 g=0.4 mol of about 37% formaldehyde solution
960 ml of toluene Feed: 31.6 g=0.4 mol of 2-mercaptoethanol (Aldrich, ≥99%)

Duralink HTS and water are used as initial charge in the nitrogen-flushed apparatus. The stirrer is switched on, and then first sodium hydrogencarbonate is added, followed by formaldehyde and toluene.

At a reaction temperature of from 20 to 25° C., 2-mercaptoethanol is then added dropwise within about 30 min, with nitrogen blanketing.

Once addition has ended, stirring is continued at 20-25° C. overnight. The mixture is transferred to a 2l separating funnel. After addition of 8.8 g of sodium chloride, the phases can be separated. The aqueous phase is then extracted twice, in each case with 300 ml of toluene. The combined organic phases are extracted three times, in each case with 300 ml of demineralized water, dried over sodium sulphate, and isolated by filtration.

The product is extracted by freezing at −6° C., isolated by way of a D4 frit, and dried in a vacuum drying oven at 25° C.

Yield: 30.2 g (50%) of a substance of the idealized formula

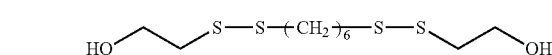

Example 2

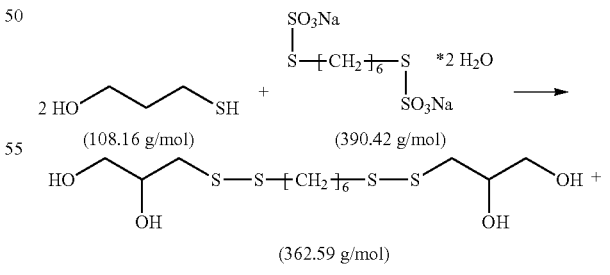

Batch size: 0.25 mol
Apparatus: 2000 ml four-necked flask with thermometer, dropping funnel with pressure equalization, reflux condenser with gas-discharge attachment (bubble counter) and tubing, 250 rpm stirrer, pH meter Initial charge: 99.1 g=0.25 mol of Duralink HTS from Flexsys (98.48%) 600 ml of demineralized water
42 g=0.5 mol of about 37% formaldehyde solution
42 g=0.5 mol of sodium hydrogencarbonate
50 ml of toluene Feed: 54.4 g=0.5 mol of thioglycerol (99.4%, Bruno Bock)

Duralink HTS and water are used as initial charge in the nitrogen-flushed apparatus. The stirrer is switched on, and then first sodium hydrogencarbonate is added, followed by formaldehyde and then toluene.

At a reaction temperature of from 20 to 25° C., the thioglycerol is then added dropwise within about 30 min, with nitrogen blanketing. Once addition has ended, a further 200 ml of demineralized water are added so that the mixture is easier to stir. Stirring is then continued at from 20 to 25° C. for 22 h, and the solid is then isolated by suction filtration by means of a D4 frit. The product is then washed six times, in each case with 500 ml demineralized water (conductivity<0.3 millisiemens). The product is then dried to constant weight at 25° C. in a vacuum drying oven.

Yield: 80.4 g (90.6%) of a substance of the idealized formula

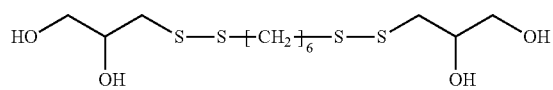

Example 3

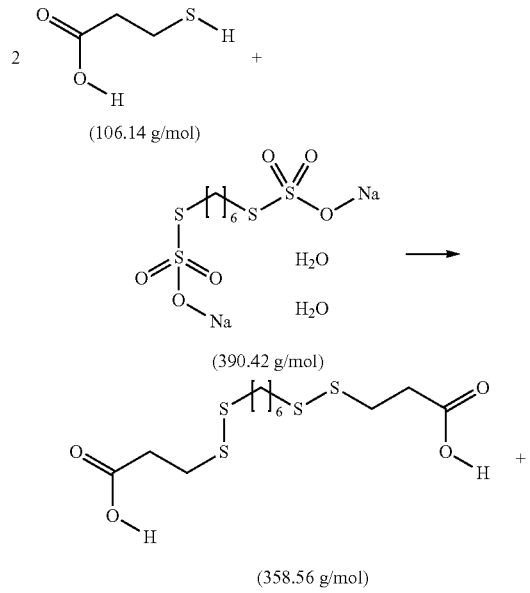

Apparatus: 2000 ml four-necked flask with thermometer, dropping funnel with pressure equalization, reflux condenser with gas-discharge attachment (bubble counter) and tubing, 250 rpm stirrer, Dulcometer Initial charge: 88.6 g=0.22 mol of Duralink HTS from Flexsys
600 ml of demineralized water
42 g=0.5 mol of about 37% formaldehyde solution
42 g=0.5 mol of sodium hydrogencarbonate Feed: 53.61 g=0.5 mol of 3-mercaptopropionic acid (Aldrich, ≥99%)

Auxiliaries: 15% NaOH
37% HCl

Duralink HTS and water are used as initial charge in the nitrogen-flushed apparatus. The stirrer is switched on, and then first sodium hydrogencarbonate is added, followed by formaldehyde.

At a reaction temperature of from 20 to 25° C., the 3-mercaptopropionic acid is then added dropwise within about 1 h, with nitrogen blanketing. During the reaction, a Dulcometer is used to maintain the pH value at pH 8 (±0.2), with 15% NaOH.

Once addition has ended, pH is adjusted to pH 2 with 37% hydrochloric acid, under nitrogen blanketing, with cooling, at 22 (±1)° C.

The reaction suspension is then subjected to suction filtration by means of a D4 frit. The product is then washed six times, in each case with 300 ml of demineralised water (conductivity<0.3 millisiemens). The product is dried to constant weight at 25° C. in a vacuum drying oven.

Yield: 50.8 g (64.4%) of a substance of the idealized formula

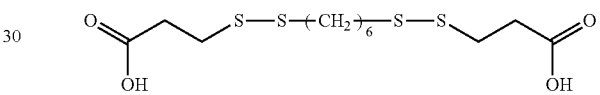

Example 4

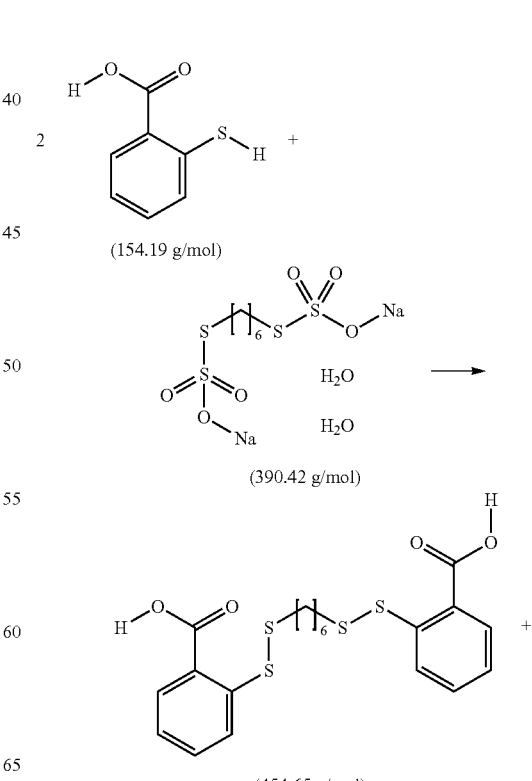

-continued

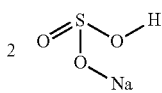

Apparatus: 2000 ml four-necked flask with thermometer, dropping funnel with pressure equalization, reflux condenser with gas-discharge attachment (bubble counter) and tubing, stirrer, gas-inlet tube Initial charge: 99.1 g=0.25 mol of Duralink HTS from Flexsys (98.48%)
  600 ml of demineralized water
  41.1 g=0.5 mol of about 36.5% formaldehyde solution
  42 g=0.5 mol of sodium hydrogencarbonate Feed: 78.7 g=0.5 mol of 2-mercaptobenzoic acid (98%), dissolved in 500 ml of water at pH 8 under nitrogen via NaOH addition Auxiliary: 37% HCl Duralink HTS and water are used as initial charge in the nitrogen-flushed apparatus. The stirrer is switched on, and then first sodium hydrogencarbonate is added, followed by formaldehyde.

At a reaction temperature of from 20 to 25° C., the solution of sodium salt of 2-mercaptobenzoic acid is then added dropwise within about 1 h, with nitrogen blanketing. Once addition has ended, stirring is continued for 22 h and then pH is adjusted to pH 2 with 37% hydrochloric acid, under nitrogen blanketing, at from 20 to 25° C.

Stirring is continued for a further hour, and the solid is then isolated by suction filtration by means of a D4 frit. The product is then washed, in each case with 300 ml of demineralized water (conductivity<0.3 millisiemens). The product is then dried to constant weight at 25° C. in a vacuum drying oven.

Yield: 113.3 (99.7%) of a polysulphide mixture of the idealized formula

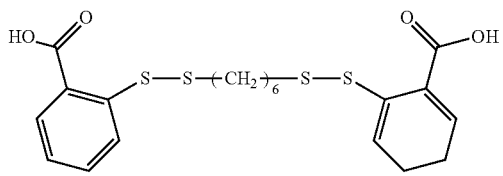

Example 5

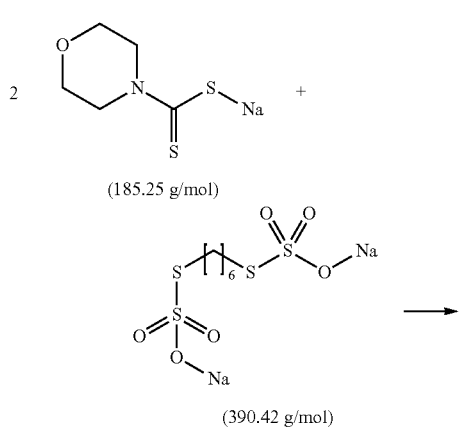

-continued

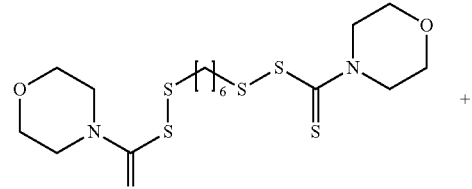

(472.80 g/mol)

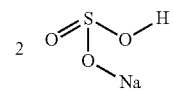

Apparatus: 2000 ml four-necked flask with thermometer, dropping funnel with pressure equalization, reflux condenser with gas-discharge attachment (bubble counter) and tubing, stirrer, pH meter Initial charge: 79.6 g=0.2 mol of Duralink HTS from Flexsys (98.14%)
  272 ml of demineralized water
  32.9 g=0.4 mol of about 36.5% formaldehyde solution
  33.6 g=0.4 mol of sodium hydrogencarbonate
  40 ml of toluene Feed: 791.7 g=0.4 mol Na salt of morpholinedithiocarboxylic acid (11.7%)

Duralink HTS and water are used as initial charge in the nitrogen-flushed apparatus. The stirrer is switched on, and then first sodium hydrogencarbonate is added, followed by formaldehyde and then toluene.

At a reaction temperature of from 20 to 25° C., the Na salt of morpholinedithiocarboxylic acid (aqueous solution) is then added dropwise within about 30 min, with nitrogen blanketing. Once addition has ended, stirring is continued at from 20 to 25° C. for 22 h, and the solid is then isolated by suction filtration by means of a D4 frit. The product is then washed four times, in each case with 300 ml demineralized water (conductivity<0.3 millisiemens). The product is then dried to constant weight at 35° C. in a vacuum drying oven.

Yield: 35.9 g (38%) of a substance of the idealized formula

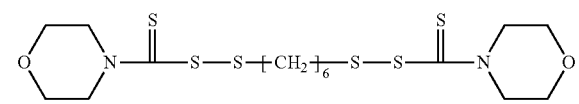

Results

The examples below provide further explanation of invention, but there is no intention that the invention be restricted thereby.

The following rubber formulations, listed in Table 1, were selected for the tests. Unless otherwise stated, all numeric data are based on "parts per hundred rubber" (phr).

The following rubber mixtures were produced in a 1.5 L internal mixer (70 rpm), start temperature 80° C. mixing time: 5 minutes. Sulphur and accelerator were finally admixed on a roll (temperature: 50° C.).

TABLE 1

| Rubber formulation | | | |
|---|---|---|---|
| | Reference | Rubber formulation 1 | Rubber formulation 2 |
| BUNA CB 24 | 30 | 30 | 30 |
| BUNA VSL 5025-1 | 96 | 96 | 96 |
| CORAX N 339 | 6.4 | 6.4 | 6.4 |
| VULKASIL S | 80 | 80 | 80 |
| TUDALEN 1849-1 | 8 | 8 | 8 |
| EDENOR C 18 98-100 | 1 | 1 | 1 |
| VULKANOX 4020/LG | 1 | 1 | 1 |
| VULKANOX HS/LG | 1 | 1 | 1 |
| ROTSIEGEL ZINC WHITE | 2.5 | 2.5 | 2.5 |
| ANTILUX 654 | 1.5 | 1.5 | 1.5 |
| SI 69 | 6.4 | 6.4 | 6.4 |
| VULKACIT D/C | 2 | 2 | 2 |
| VULKACIT CZ/C | 1.5 | 1.5 | 1.5 |
| CHANCEL 90/95 GROUND SULPHUR | 1.5 | 1.5 | 1.5 |
| Vulcuren | | 1 | 1 |
| Polysulphide additive of Example 4 | | 1 | |
| Polysulphide additive of Example 3 | | | 1 |

| Non-inventive comparisons | Comparison 1 | Comparison 2 | Comparison 3 |
|---|---|---|---|
| BUNA CB 24 | 30 | 30 | 30 |
| BUNA VSL 5025-1 | 96 | 96 | 96 |
| CORAX N 339 | 6.4 | 6.4 | 6.4 |
| VULKASIL S | 80 | 80 | 80 |
| TUDALEN 1849-1 | 8 | 8 | 8 |
| EDENOR C 18 98-100 | 1 | 1 | 1 |
| VULKANOX 4020/LG | 1 | 1 | 1 |
| VULKANOX HS/LG | 1 | 1 | 1 |
| ROTSIEGEL ZINC WHITE | 2.5 | 2.5 | 2.5 |
| ANTILUX 654 | 1.5 | 1.5 | 1.5 |
| SI 69 | 6.4 | 6.4 | 6.4 |
| VULKACIT D/C | 2 | 2 | 2 |
| VULKACIT CZ/C | 1.5 | 1.5 | 1.5 |
| CHANCEL 90/95 GROUND SULPHUR | 1.5 | 1.5 | 1.5 |
| Vulcuren | 1 | | |
| Polysulphide additive of Example 4 | | 1 | |
| Polysulphide additive of Example 3 | | | 1 |

| | | |
|---|---|---|
| BUNA CB 24 | BR | Lanxess Deutschland GmbH |
| BUNA VSL 5025-1 | SBR | Lanxess Deutschland GmbH |
| CORAX N 339 | Carbon black | Degussa-Evonik GmbH |
| VULKASIL S | Silica | Lanxess Deutschland GmbH |
| TUDALEN 1849-1 | Mineral oil | Hansen&Rosenthal KG |
| EDENOR C 18 98-100 | Stearic acid | Cognis Deutschland GmbH |
| VULKANOX 4020/LG | N-1,3-dimethylbutyl-N-phenyl-p-phenylenediamine | Lanxess Deutschland GmbH |
| VULKANOX HS/LG | Polymerized 2,2,4-trimethyl-1,2-dihydroquinoline | Lanxess Deutschland GmbH |
| ROTSIEGEL ZINC WHITE | Zinc oxide | Grillo Zinkoxid GmbH |
| ANTILUX 654 | Light-stabilizer wax | RheinChemie Rheinau GmbH |
| Si 69 | bis(triethoxysilylpropyl) tetrasulphide | Evonik Industries |
| VULKACIT D/C | 1,3-Diphenylguanidine | Lanxess Deutschland GmbH |
| VULKACIT CZ/C | N-cyclohexyl-2-benzo-thiazole-sulphenamide | Lanxess Deutschland GmbH |
| CHANCEL 90/95 GROUND SULPHUR | Sulphur | Solvay Deutschland GmbH |
| Vulcuren | 1,6,bis(N,N-dibenzyl-thiocarbamoyldithio)hexane | Lanxess Deutschland GmbH |

TABLE 2

Collation of results

| Parameter | Unit | DIN | Reference | Rubber formulation 1 |
|---|---|---|---|---|
| Mooney viscosity (ML 1 + 4) | [MU] | 53523 | 95 | 98 |
| Mooney scorch at 130° C. (t5) | sec | acc. to ASTM D 5289-95 | 1253 | 630 |
| Full vulcanization at 170° C./t95 | s | 53529 | 1417 | 301 |
| Shore A hardness at 23° C. | [Shore A] | 53505 | 66 | 69 |
| 300 modulus | MPa | 53504 | 15 | 21 |
| Elongation at break | % | 53504 | 349 | 302 |
| Tensile strength | MPa | 53504 | 19 | 21 |
| Abrasion | mm$^3$ | 53516 | 74 | 60 |
| Wet skid performance (tan d (0° C.)) | — | | 0.463 | 0.384 |
| Rolling resistance (tan d (60° C.)) | — | | 0.133 | 0.109 |

Surprisingly, as shown by the results in Table 2, it was found that hardness (Shore A) measured in the Inventive Example (rubber formulation 1) was higher when comparison was made with the reference. Mechanical properties such as tensile strength, elongation at break and in particular 300 modulus are very good. Wet skid performance is good (tan delta at 0° C.>0.35). There is a marked improvement in rolling resistance when comparison is made with the reference (tan delta at 60° C.<0.12). The abrasion values (<70 mm) are likewise very advantageous. There was a marked improvement in full vulcanization time (less than 500 seconds).

TABLE 2a

Collation of results of comparisons

| Parameter | Unit | DIN | Comparison 1 | Comparison 2 | Comparison 3 |
|---|---|---|---|---|---|
| Mooney viscosity (ML 1 + 4) | [MU] | 53523 | 106 | 89 | 94 |
| Moorsey scorch at 130° C. (t5) | sec | acc. to ASTM D 5289-95 | 551 | 1495 | 1573 |
| Full vulcanization at 170° C./t95 | s | 53529 | 262 | 1588 | 1798 |
| Shore A hardness at 23° C. | [Shore A] | 53505 | 65 | 72 | 69 |
| 300 modulus | MPa | 53504 | 19.5 | 15 | 15 |
| Elongation at break | % | 53504 | 313 | 338 | 384 |
| Tensile strength | MPa | 53504 | 20.5 | 18 | 21 |
| Abrasion | mm$^3$ | 53516 | 78 | 76 | 80 |
| Wet skid performance (tan d (0° C.)) | — | | 0.434 | 0.407 | 0.432 |
| Rolling resistance (tan d (60° C. ) | — | | 0.112 | 0.145 | 0.151 |

Surprisingly, as shown by the results in Table 2 and 2a, the vulcanisate of the invention was found to have better 300 modulus values and excellent rolling resistance (tan delta at 60° C.<0.12) in combination with high hardness. The very advantageous abrasion values (<70 mm$^3$) of the Inventive Example are very particularly surprising. Abrasion was improved by 20% in the Inventive Example when comparison is made with the Comparative Examples and the reference.

Testing of the Rubber Mixture and of the Vulcanisates:
Mooney Viscosity Measurement:
Viscosity can be determined directly from the resisting force exerted by the rubbers (and rubber mixtures) while they are processed. In the Mooney shearing-disc viscometer a grooved disc is surrounded above and below by sample substance and is rotated at about two revolutions per minute in a heatable chamber. The force required for this purpose is measured in the form of torque and corresponds to the respective viscosity. The specimen is generally preheated to 100° C. for 1 minute; the measurement takes a further 4 minutes, while the temperature is held constant.

The viscosity is given together with the respective test conditions, an example being ML (1+4) 100° C. (Mooney viscosity, large rotor, preheat time and test time in minutes, test temperature).

The viscosities of the rubber mixtures specified in Table 1 are measured by means of a Mooney shearing-disc viscometer.

Scorch Performance (t5 Scorch Time):

The same test can also be used as described above to measure the "scorch" performance of a mixture. The temperature selected in this Patent is 130° C. The rotor runs until, after the torque value has passed through a minimum, it has risen to 5 Mooney units relative to the minimum value (t5). The greater the value (the unit here being seconds), the slower the scorch (high scorch values here).

Rheometer (Vulcameter) 170° C./t95 Full Vulcanizaton Time:

The progress of vulcanization in a MDR (moving die rheometer) and analytical data therefor are measured in accordance with ASTM D5289-95 in a MDR 2000 Monsanto rheometer. Table 2 collates the results of this test.

The time at which 95% of the rubber has crosslinked is measured as the full vulcanization time. The temperature selected was 170° C.

Determination of Hardness:

In order to determine the hardness of the rubber mixture according to the invention, milled sheets of thickness 6 mm made of the rubber mixture were produced according to formulations from Table 1. Test specimens of diameter 35 mm were cut from the milled sheets, and the Shore A hardness values were determined for these by means of a digital Shore hardness tester (Zwick GmbH & Co. KG, Ulm).

Tensile Test:

The tensile test serves directly to determine the loading limits of an elastomer. The longitudinal elongation at break is divided by the initial length to give the elongation at break. The force required to reach certain stages of elongation, mostly 50, 100, 200 and 300%, is also determined and expressed as modulus (tensile strength at the given elongation of 300%, or 300 modulus).

Table 2 lists the test results.

Dyn. Damping:

Dynamic test methods are used to characterize the deformation performance of elastomers under loadings which change periodically. An external stress changes the conformation of the polymer chain.

This measurement determines the loss factor tan delta indirectly by way of the ratio between loss modulus G" and storage modulus G'.

What is claimed is:

1. A silica-containing rubber mixture produced from at least one rubber, one sulphur-containing alcoxysilane, one crosslinking agent, one filler, and optionally further rubber auxiliary products, the mixture comprising:

0.1 to 15 parts by weight, based on 100 parts by weight of rubber used, of 1,6-bis(N,N-dibenzylthiocarbamoyl-dithio)hexane (CAS No.: 151900-44-6); and 0.1 to 15 parts by weight, based on 100 parts by weight of rubber used, of a polysulphide additive of the formula (I)

$$A\text{-}S\text{---}(S)_x\text{---}S\text{---}Y\text{---}S\text{---}(S)_x\text{---}S\text{-}A \quad (I)$$

where x is 0, 1 or 2,

Y is an aliphatic, cycloaliphatic or aromatic group that is optionally substituted or else comprises heteroatoms and A is a moiety

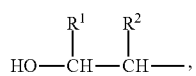

where $R^1$ to $R^2$ are identical or different and are hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl, or A is a moiety

in which $R^1$ and $R^2$ are identical or different and are hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl, or A is a moiety

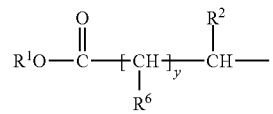

in which $R^1$ to $R^2$ are identical or different and are hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2$—$COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl and $R^6$ is hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2$—$COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl and y is 0, 1 or 2, or, if Y is —$(CH_2)_6$— and x is 0, A is

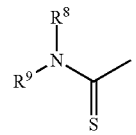

in which $R^8$ and $R^9$ are mutually independently hydrogen, $C_1$-$C_6$-alkyl, $C_5$-$C_6$-cycloakyl, $C_6$-$C_{10}$-aryl or a group —$CH_2$—$OR^5$, —$CH_2$—$CH_2$—$OR^5$, —$CH_2$—$COOR^5$, —$CH_2$—$CH_2$—$COOR^5$ and $R^8$ and $R^9$ can also optionally form a ring together with the respective nitrogen atom, and $R^5$ is defined as above, where both moieties A of the compound of the formula I can be identical or different, and at least one of the moieties $R^8$ and $R^9$ on one of the moieties A comprises one or more oxygen atoms.

2. The silica-containing rubber mixture according to claim 1, wherein Y is one of the groups:

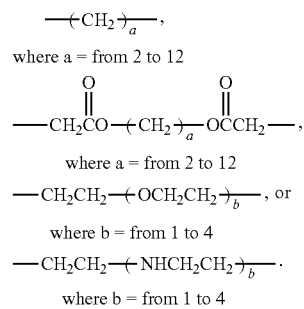

3. The silica-containing rubber mixture according to claim 1, wherein the polysulphide additive comprises at least one compound of the formulae (II), (III), (IV), (IVa), (V), (Va), (VI) or (VIa)

(II)

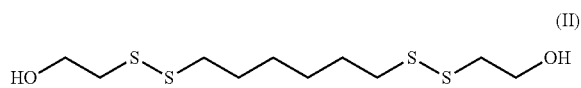

-continued

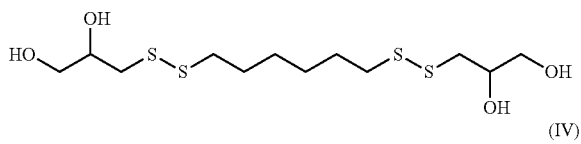
(III)

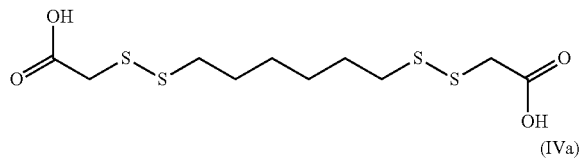
(IV)

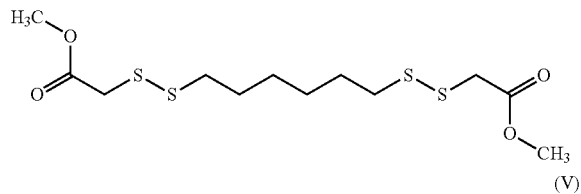
(IVa)

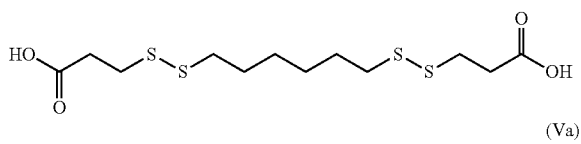
(V)

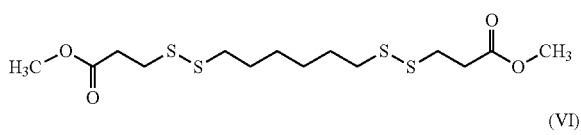
(Va)

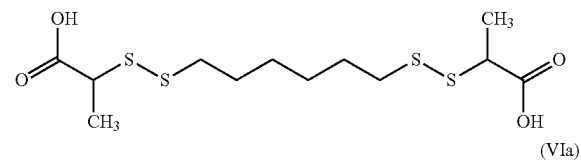
(VI)

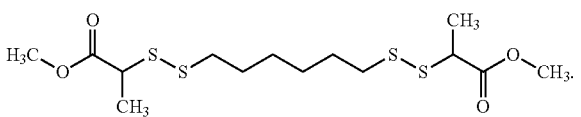
(VIa)

4. The silica-containing rubber mixture according to claim 1, wherein the polysulphide additive comprises at least one compound of the formula (VII)

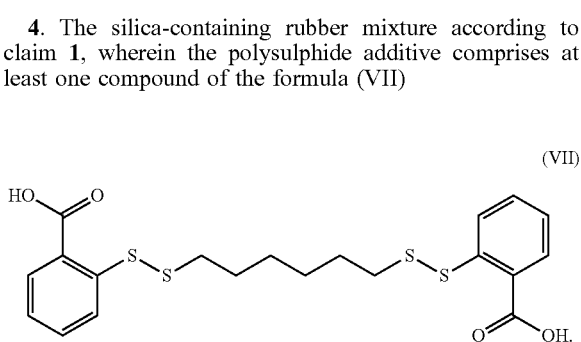
(VII)

5. The silica-containing rubber mixture according to claim 1, wherein the quantity of sulphur-containing alkoxysilanes is greater than or equal to the quantity of polysulphide additives of the formula (I).

6. The silica-containing rubber mixture according to claim 1, wherein the rubber mixture comprises 1 to 15 parts by weight of one or more sulphur-containing alkoxysilanes, based on 100 parts by weight of rubber used, where the ratio by weight of sulphur-containing alkoxysilane to polysulphide additive of the formula (I) is 1.5:1 to 20:1.

7. The silica-containing rubber mixture according to claim 1, wherein the rubber mixture comprises 0.3 to 7 parts by weight of one or more polysulphide additives of the formula (I), based on 100 parts by weight of rubber used, and 0.3 to 7 parts by weight based on 100 parts by weight of rubber used, of 1,6-bis(N,N-dibenzylthiocarbamoyldithio)hexane (CAS No.: 151900-44-6).

8. The silica-containing rubber mixture according to claim 1, wherein the polysulphide additive comprises at least one compound of the formula (VIII)

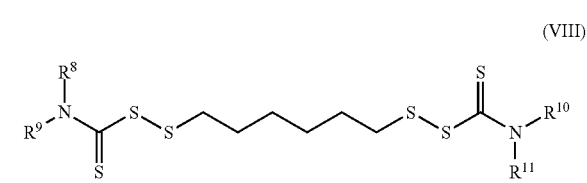
(VIII)

in which
R$^8$, R$^9$, R$^{10}$ and R$^{11}$ are mutually independently hydrogen, C$_1$-C$_6$-alkyl, C$_5$-C$_6$-cycloalkyl, C$_6$-C$_{10}$-aryl or a group —CH$_2$—OR$^5$, —CH$_2$—CH$_2$—OR$^5$, —CH$_2$—COOR$^5$, —CH$_2$—CH$_2$—COOR$^5$ and R$^8$ and R$^9$ and, respectively, R$^{10}$ and R$^{11}$ can also optionally form a ring together with the respective nitrogen atom, and R$^5$ is as defined above, and at least one of the moieties R$^8$, R$^9$, R$^{10}$ and R$^{11}$ comprises one or more oxygen atoms.

9. The silica-containing rubber mixture according to claim 8, wherein the polysulphide additive comprises at least one compound of the formulae (IX), (X) or (XI)

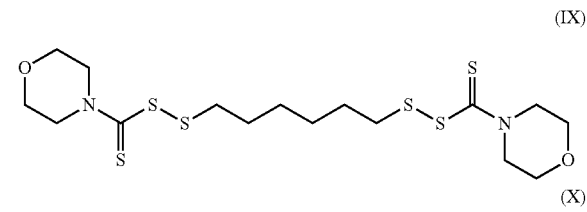
(IX)

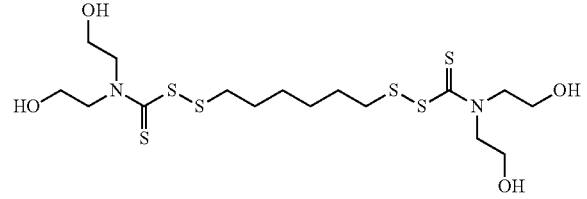
(X)

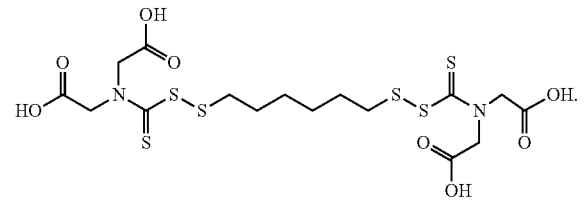
(XI)

10. The silica-containing rubber mixture according to claim 1, wherein the rubber comprises at least one SBR rubber and at least one BR rubber.

11. The silica-containing rubber mixture according to claim 10, wherein the rubber further comprises at least one NR rubber.

12. The silica-containing rubber mixture according to claim 1, wherein the rubber mixture comprises 50 to 200 parts by weight of one or more inorganic and/or organic fillers based on 100 parts by weight of rubbers used.

13. The silica-containing rubber mixture according to claim 12, wherein the at least one filler is selected from the group of precipitated silicas and/or silicates with specific surface area of 20 to 400 m²/g.

14. The silica-containing rubber mixture according to claim 12, wherein the rubber mixture comprise 60 to 120 parts by weight of the filers and the filler is selected from the group of precipitated silicas and/or silicates with specific surface area of 100 to 200 m²/g.

15. The silica-containing rubber mixture according to claim 1, wherein Y is —(CH$_2$)$_6$—.

16. The silica-containing rubber mixture according to claim 15, wherein the rubber mixture comprises:
  at least one SBR rubber and at least one BR rubber in a ratio by weight SBR:BR of 60:40 to 90:10;
  1 to 15 parts by weight of one or more sulphur-containing alkoxysilanes, based on 100 parts by weight of the rubber used, where the ratio by weight of the sulphur-containing alkoxysilane to the polysulphide additive of the formula (I) is 1.5:1 to 20:1;
  0.3 to 7 parts by weight of the one or more polysulphide additives of the formula (I), based on 100 parts by weight of rubber used, and 0.3 to 7 parts by weight, based on 100 parts by weight of rubber used, of the 1,6-bis(N,N-dibenzylthiocarbamoyldithio)hexane (CAS No.: 151900-44-6); and
  50 to 200 parts by weight, based on 100 parts by weight of the rubbers used, of one or more inorganic and/or organic fillers.

17. The silica-containing rubber mixture according to claim 16, wherein:
  Y is —(CH$_2$)$_6$—;
  the rubber further comprises at least one NR rubber;
  the ratio by weight of the sulphur-containing alkoxysilane to the polysulphide additive of the formula (I) is 5:1 to 15:1;
  the rubber mixture comprises 0.5 to 5 parts by weight, of the one or more polysulphide additives of the formula (I), based on 100 parts by weight of rubber used, and 0.5 to 5 parts by weight, based on 100 parts by weight of rubber used, of the 1,6-bis(N,N-dibenzylthiocarbamoyldithio)hexane (CAS No.: 151900-44-6);
  the rubber mixture comprises 60 to 120 parts by weight, based on 100 parts by weight of rubbers used, of the one or more inorganic and/or organic fillers; and
  the fillers are selected from the group of oxidic, silicatic filers and carbon blacks and mixtures of these.

18. Vulcanisates and rubber mouldings comprising the silica-containing rubber mixtures according to claim 1.

19. A process for the production of the silica-containing rubber mixture according to claim 1, the process comprising, in a mixing process which has a plurality of mixing stages, where these can optionally be subdivided into a plurality of component steps, mixing:
  one or more rubbers,
  one or more hydroxylated oxidic fillers,
  one or more sulphur-containing alkoxysilanes,
  one or more vulcanization additives,
  one or more rubber additives,
  the at least one polysulphide additive according to claim 1, and
  the 1,6-bis(N,N-dibenzylthiocarbamoyldithio)hexane (CAS No.: 151900-44-6)
wherein the polysulphide additive and the 1,6-bis(N,N-dibenzylthiocarbamoyldithio)hexane are incorporated by mixing in a first mixing stage of the plurality of mixing stages.

20. An additive mixture comprising, based on 100 parts by weight of additive mixture, 10 to 90 parts by weight of one or more polysulphide additives of the formula (I) according to claim 1, and 10 to 90 parts by weight of 1,6-bis(N,N-dibenzylthiocarbamoyldithio)hexane (CAS No.: 151900-44-6.

* * * * *